US000001876H

United States Statutory Invention Registration [19]

[11] Reg. Number: H1,876

Knox et al. [45] Published: Oct. 3, 2000

[54] HIGH POWER LAMP COOLING

[76] Inventors: Richard M. Knox, 5231 Norborne La., Houston, Tex. 77069; Dale S. Walker, 12318 Advance Dr., Houston, Tex. 77065; William Burton Mercer, 6603 Moccasin Bend, Spring, Tex. 77379

[21] Appl. No.: 09/175,126

[22] Filed: Oct. 19, 1998

[51] Int. Cl.[7] ..... H01J 17/16

[52] U.S. Cl. ..... 313/634; 362/35; 362/264

*Primary Examiner*—Daniel T. Pihulic

[57] ABSTRACT

Light sources include an electrodeless bulb having an interior, a fill contained within the interior of the bulb, an excitation structure that transmits electromagnetic energy to the fill in the bulb, and cooling fins extending radically outward from the bulb. The fill is excited by the electromagnetic energy to a plasma state that causes light emission and generates heat energy. The cooling fins, when rotated, draw air toward the bulb to cool the bulb. Alternatively, cooling may be provided by a rotatable squirrel cage about an electrodeless bulb. The light sources can be used in display systems, such as field sequential color systems.

35 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

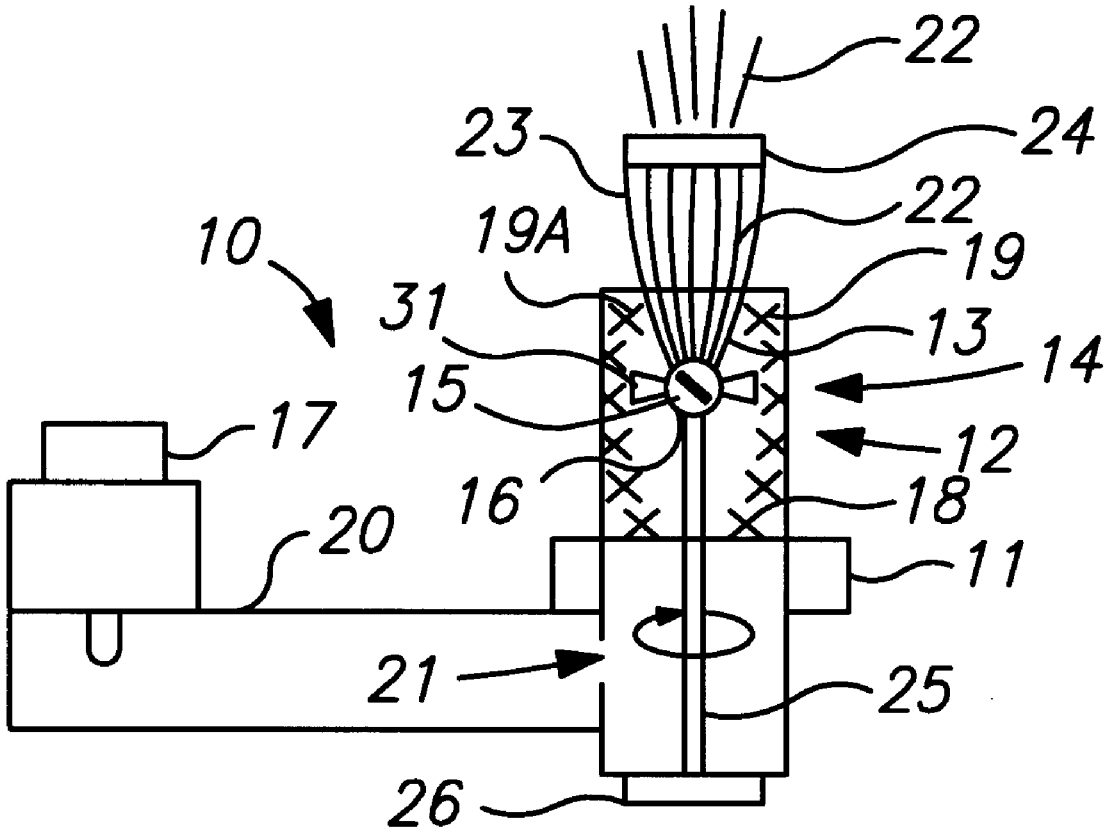

HIGH POWER LAMP COOLING

BACKGROUND OF THE INVENTION

1. Field of the Invention

The present invention relates to high power lamps. More particularly, the present invention relates to cooling high power lamps and the use of such lamps in display systems.

2. Description of Related Art

A high power light source required for industrial or commercial applications typically has higher output than incandescent and fluorescent lamps. One type of lamp, known as a high intensity discharge (HID) lamp is constructed of a glass (or other thermally insulative) envelope that contains electrodes and a fill, typically mercury. The mercury vaporizes and becomes a light emitting gas when the lamp is operated. U.S. Pat. Nos. 5,404,076, entitled "Lamp Including Sulfur," and 5,606,220, entitled "Visible Lamp Including Selenium or Sulfur," both issued to Dolan et al., incorporated by reference herein in their entirety, disclose electrodeless HID lamps. These lamps include a bulb that uses a solid sulfur or selenium, or compounds of these elements, fill at a pressure at least as high as one atmosphere. These lamps are constructed with excitation sources and excitation structures (e.g., electrodes or microwave waveguides) adjacent the glass envelope. With microwave excitation, the fill in Dolan is excited to a plasma state at a power density in excess of 50 watts per cubic centimeter. Another lamp disclosed in Dolan includes electrodes and uses a similar fill at a pressure at least as high as one atmosphere. The fill in this lamp is excited using radio frequency (rf) excitation at a power density of at least 60 watts per cubic centimeter instead of using microwave energy. These lamps can also be operated at other pressures and power densities. Moreover, the lamp emission spectrum can be tailored by using additive materials in the fill, such as metal halides.

Prior, co-owned U.S. Pat. application Ser. No. 08/747,190, now U.S. Pat. No. 5,833,360, filed Nov. 12, 1996, by Richard M. Knox, Dale S. Walker, and William Burton Mercer, entitled "High Efficiency Lamp Apparatus for Producing a Beam of Polarized Light," incorporated by reference herein in its entirety, discloses a high efficiency lamp that produces polarized light. The lamp allows light of a preferred polarization and of preferred wavelengths to pass that is produced by an excited fill. However, the lamp redirects light of non-preferred polarizations and non-preferred (i.e., off-spectral) wavelengths as reflected light back to the light source. The reflected light is used to "optically pump" the fill by reabsorption for re-emission in the preferred polarization and at the preferred wavelengths. The preferred wavelengths are redshifted from the redirected (off-spectral) wavelengths.

Generally, these lamps or light sources generate much thermal energy while forming and maintaining the fill in the plasma state. The thermal energy can lead to high temperatures. Exposure of the lamp to high temperatures over an extended period of time can degrade the bulb and possibly the performance of electronics for powering the lamp. A cooling system is, therefore, needed. The aforementioned U.S. Pat. Nos. 5,404,076 and 5,606,220 disclose the use of compressed air jets or streams directed at the lamp to provide the necessary cooling while the bulb is spun or rotated in the jets. Air jets and a compressor, however, can increase the cost and complexity of the lamp.

The present invention is directed to overcoming or reducing one or more of the foregoing problems and other shortcomings.

SUMMARY OF THE INVENTION

In general, in one aspect, embodiments of the invention feature a light source including a bulb having an interior, a fill contained within the interior, and a fin extending from the bulb that, when rotated, draws air past the bulb.

BRIEF DESCRIPTION OF THE DRAWINGS

Other objects and advantages of the invention will become apparent upon reading the following detailed description and upon reference to the drawings in which.

Figure 1:
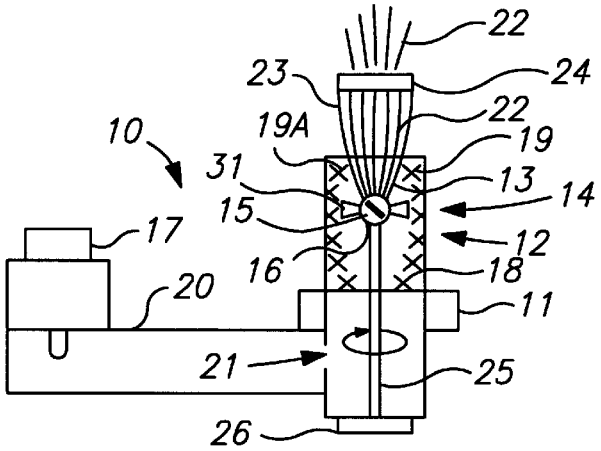
FIG. 1 is a side view of a light source in accordance with an embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention, as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

Figure 2:
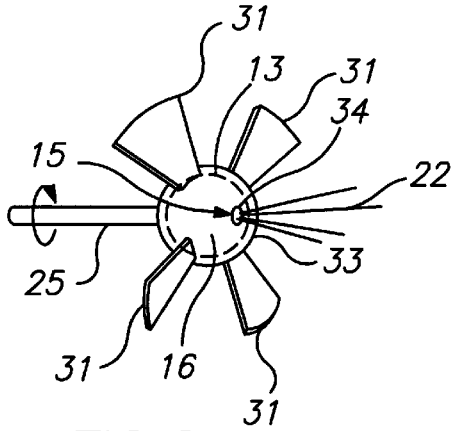
FIG. 2 is a perspective view of a bulb in the light source in FIG. 1 in accordance with an embodiment of the invention.
Figure 3:
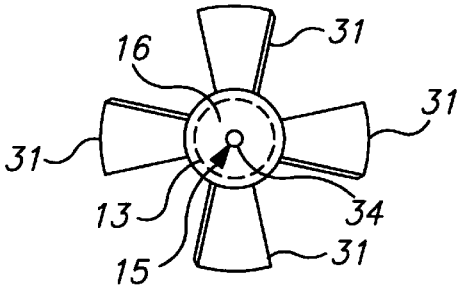
FIG. 3 is a top view and FIG. 4 is a side view of the bulb in FIG. 2.

FIG. 1 shows a light source 10 that includes a lamp 12 having an electrodeless bulb 13, in accordance with an embodiment of the invention. The lamp 12 can be powered by electromagnetic energy, or in alternative embodiments, by energy from an electric arc. The bulb 13 is constructed of quartz, sapphire, high temperature plastic, ceramic, glass, or the like (e.g., in the shape of an envelope, sphere or tube), or of other transparent materials that can withstand heat generated in the bulb 13. The bulb 13 is supported in a cavity 14. As shown in FIG. 2, the bulb 13 includes a hollow interior or chamber 15 that contains a high pressure fill 16, for example, sulfur, selenium, or other suitable solid material, and perhaps a metal halide additive. A source 17 generates the electromagnetic energy, such as microwave energy, which is fed to the cavity 14. The cavity 14 is defined or formed by a conductive housing 18 and a mesh 19, which is shown partially cut-out for clarity in FIG. 1. For microwave energy, the cavity 14 is a microwave cavity and the source 17 may be a magnetron, klystron, or other microwave generating device. At least one excitation structure 20, such as a waveguide, or an electrode or an analogous structure in other embodiments, is adjacent the bulb 13 (or the fill 16 in the bulb 13). The excitation structure 20 provides the electromagnetic energy as microwave energy or provides rf energy or electric f energy, such as from an electric arc in other embodiments. The energy is fed by the excitation structure 20 to a coupling structure 21 (e.g. a slot) in the cavity 14. The energy excites the fill 16 in the bulb 13 to a plasma state, which radiates light. With suitable design changes to the bulb 13 and other components, the fill 16 may be alternatively excited, as will be appreciated by those skilled in the art. For example, two arc electrodes or rf excitation structures (e.g., coils) could be included instead of a microwave source with suitable changes in the excitation source 17, the excitation structure 20, and coupling structure 21, and by elimination of the cavity 14.

Regardless of the energy source and excitation means, the light 22 emitted by the fill 16 in the plasma state is transmitted by the bulb 13, which passes visible wavelengths. The light 22 is transmitted out of the cavity 14, as shown in FIG. 1, nearly or completely unencumbered by the mesh 19. This is because, for microwave excitation, the mesh 19 may be constructed of metal material that is substantially opaque (and reflective) to the longer wavelength microwave energy, while allowing the shorter wavelength light 22 to pass through openings 19A defined by the mesh 19. The mesh 19 thus prevents or reduces the likelihood of microwave energy escaping from the cavity 14. A reflector 23 may also be situated adjacent the bulb 13 for directing the light 22, but is not required. Moreover, a reflective filter 24, such as a reflecting linear polarizer may be situated in the reflector 23 to filter the light 22 or, if the reflector 23 is not included, situated elsewhere. The reflective filter 24 only substantially passes the light 22 having a desired polarization and/or wavelength properties and substantially reflects the remaining light having non-desired polarization and/or wavelength properties back to the bulb 13, as will be discussed further below. The reflective filter 24 is not substantially absorptive and may be constructed of double brightness enhancement filter (DBEF), also referred to as multilayer optical film (MOF), commercially available from 3M Company.

As shown in FIG. 1, an arm 25 is attached to the bulb 13. In alternative embodiments, the arm 25 may be integral with the bulb 13, and perhaps made of the same material. The arm 25 is mechanically coupled to a rotator 26, such as a motor. The rotator 26 can rotate the bulb 13 at a fixed frequency (e.g., at 60 Hz). In other embodiments, the frequency at which the rotator 26 rotates the bulb 13 can be varied. The arm 25, whether attached to or integral with the bulb 13, is formed as a shaft, rod, stem, or the like, and is elongated enough to allow coupling to the rotator 26 for rotation of the bulb 13. Rotation of the bulb 13 possibly assists in maintaining uniform excitation of the plasma fill 16 by the excitation energy, as will be appreciated by those skilled in the art.

Aside from fins 31, which are also attached to or integral with the bulb 13, the lamp 12 may be the same as the lamps in the aforementioned U.S. Pat. Nos. 5,404,076 and 5,606,220. The fins 31 may be a single fin or a plurality of fins, depending on the particular embodiment. The fins 31 may be constructed of the same material as the bulb 13. Moreover, the fins 31 may be attached to the bulb 13 with a shell 33 (see FIG. 2) that is formed of the same material as the fins 31. The fins 31 and the shell 33, if present, may be made of a high temperature plastic, ceramic, quartz, sapphire, glass, or the like, or metal (except for when microwave excitation is used) or of other material that conducts heat well, as long as heat generated by the bulb 13 can be withstood. The shell 33 includes an aperture 34 through which light 22 is emitted from the bulb 13.

Figure 4:
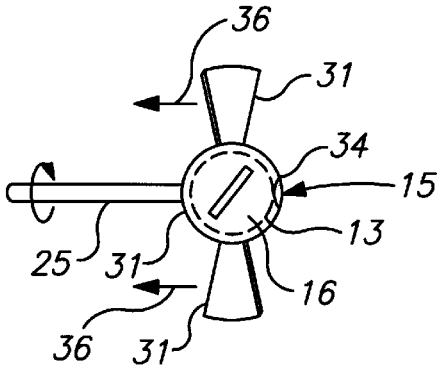
Figure 5:
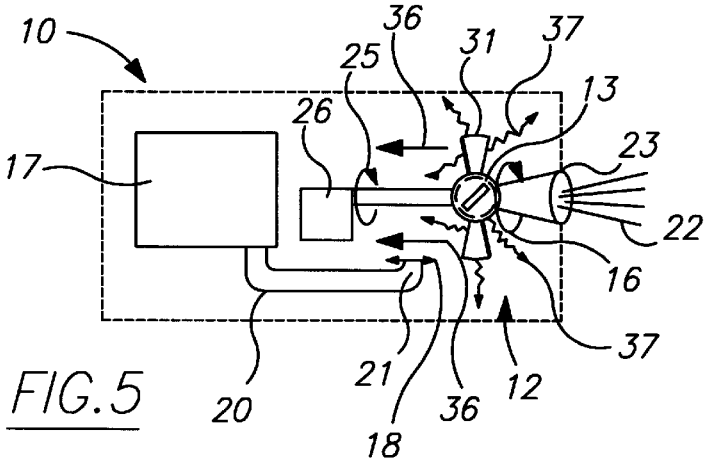
FIG. 5 is a side view of a light source in accordance with an embodiment of the invention.

FIG. 5 shows how the fins 31 operate to cool the bulb 13. The mesh 19 is omitted and the conductive housing 18 of the cavity 14 is mostly omitted in FIG. 5 for clarity. The waveguide 20 is shown terminating in the slot 21. As the arm 25 turns by the drive of the rotator 26, the fins 31 will rotate, because the fins 31 are mechanically coupled to the rotator 26 through the bulb 13 to the arm 25. The rotation of the bulb 13, besides possibly assisting in the maintenance or enhancement of excitation uniformity in the plasma fill 16 creates a drawing movement of air much like a fan, as generally indicated by arrows 36 in FIGS. 4 and 5. When the fill 16 generates heat in the excited plasma state, the air drawn by the fins will generally be of lower temperature than the air near the bulb 13. The angle, shape, and position of the fins 31 on the bulb 13 may be optimized to facilitate the drawing of the cooling air past or around the bulb 13 as it is rotated.

Air movement may provide a certain level of cooling to other components of the light source 10 that are in the vicinity of the bulb 13. For example, electronics associated with the source 17 or the rotator 26 (not shown), or any other components that generate heat in the light source 10, may also be cooled. The motion of the fins 31 with the bulb 13 and the resulting air motion can help cool these other components, as will be appreciated by those skilled in the art. However, these other components may not cool much, if at all, by rotation of the fins 31 even though the bulb 13 is cooled.

Figure 6A:
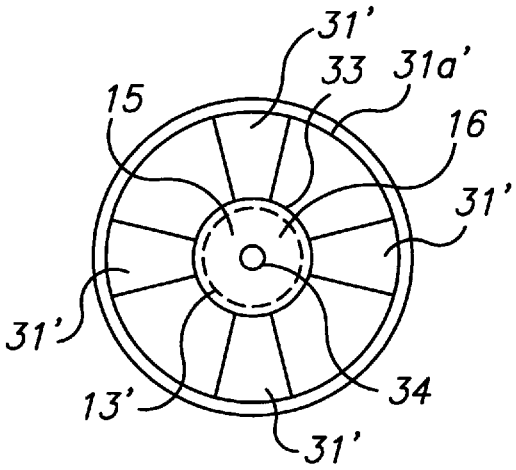
FIG. 6A is a top view and FIG. 6B is a side view of a bulb in a light source in accordance with an embodiment of the invention.
Figure 6B:
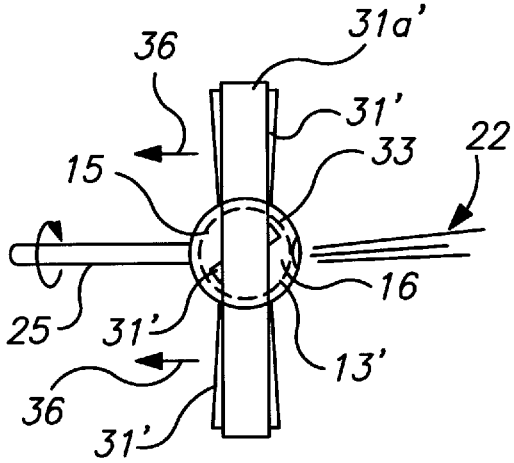
Figure 6C:
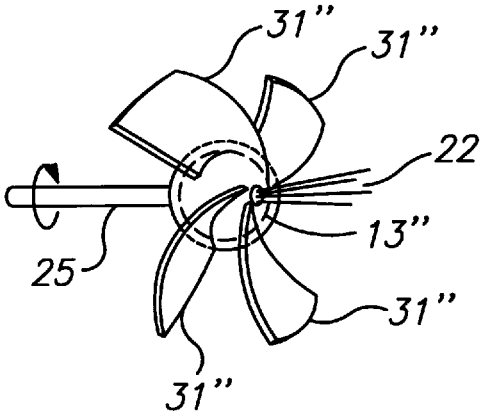
FIG. 6C is a side view of a bulb in a light source in accordance with an embodiment of the invention.

Though the fins 31 shown in FIGS. 1–5 are shaped somewhat like the blades of a propeller, which extend radially from the bulb 13, they could instead be constructed in other shapes that would likewise promote efficient cooling of the bulb 13. For example, FIG. 6A is a top view and FIG. 6B is a side view of fins 31' of a bulb 13', in accordance with another embodiment of the invention. The bulb 13' includes a peripheral (e.g., circular) portion 31*a*' as part of the fins 31' for support. FIG. 6C is a side view of still another embodiment of a bulb 13" having fins 31".

Although the fins 31" are curved in shape, the invention is not limited to the embodiment shown in FIG. 6C. The same is true for the shape of the fins 31 and 31', which, along with the fins 31", are merely illustrative examples of specific embodiments. It will be appreciated by those skilled in the art that variations in the size and in the designs of the light source 10, the bulbs 13, 13', 13", and the fins 31, 31', 31" may be made in accordance with other factors. These factors can be related to the surface area of the bulbs 13, 13', 13", the volume of the fill 16 (or plasma), the power output required for the light 22, and the thermal energy generated when the bulbs 13, 13', 13" are in operation and the fill 16 is in the plasma state.

In addition to the fan blade-like cooling function of the fins 31, 31', 31", the fins 31, 31', 31" may be in thermally dissipative contact (i.e., in thermal contact) with the bulbs 13, 13', 13", in accordance with another embodiment of the invention. Such contact will depend to a certain degree on the material from which the fins 31, 31', 31" are constructed, on the thermal conductivity of that material, and on the thermal properties of the bulbs 13, 13', 13". The fins 31, 31', 31" may thus serve to increase the effective surface area of, or to act as a heat sink for, the bulbs 13, 13', 13". This may effectuate radiative cooling of the bulbs 13, 13', 13", as generally indicated by the wavy arrows 37 in FIG. 5. An implementation could be constructed if the shell 33 in FIG. 2 were in thermal contact with the bulbs 13, 13', 13". However, it should be noted that such radiative cooling may not be necessary for cooling the bulbs 13, 13', 13", because the rotation of the fins 31, 31', 31" to draw the cooling air may provide sufficient cooling of the bulbs 13, 13', 13".

Figure 7:
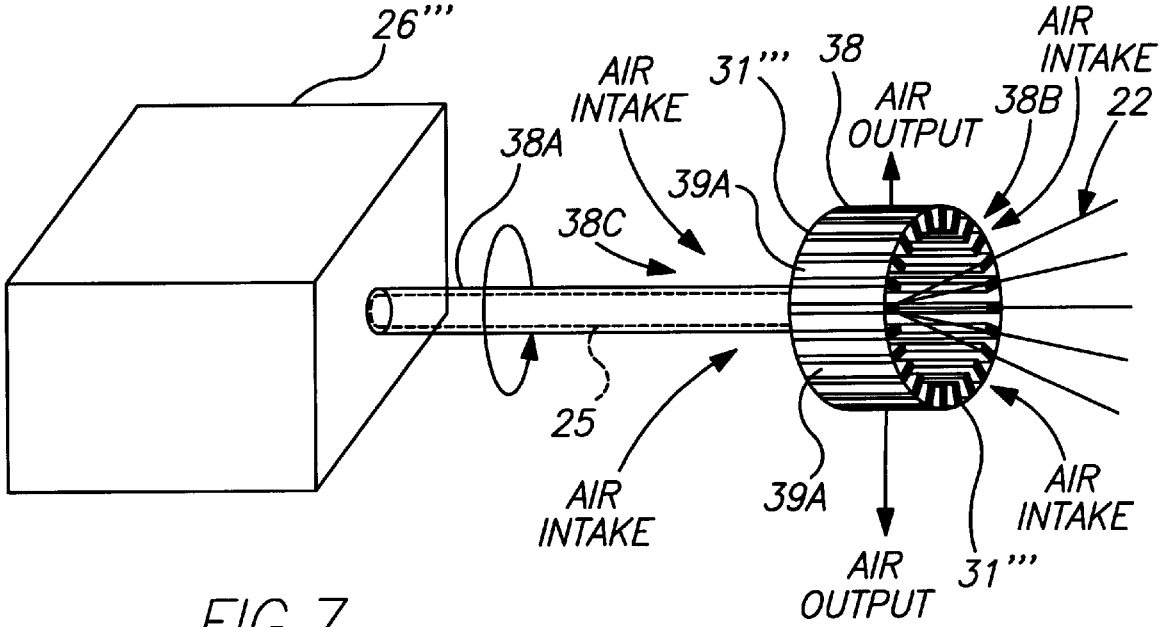
FIG. 7 is a perspective view of a bulb in a light source in accordance with an embodiment of the invention.

FIG. 7 a perspective view shows another apparatus for cooling a bulb in accordance with an embodiment of the invention. A bulb 13'", in every way similar to the bulbs 13, 13', 13" except for not having fins like the fins 31, 31', 31" (although some embodiments could have fins on the bulb), is surrounded by a cage 38 (e.g., a generally cylindrical "squirrel" cage). The cage 38 includes fins 31'" (e.g., curved fins) that extend along the length of the cage 38 as shown in FIG. 7. The cage 38 can be constructed of metal for light sources having fills excited with rf energy, or constructed of material similar to the bulb 13'" material for light sources having fills excited with microwave energy. In the embodiment shown in FIG. 7, the cage 38 includes an end 38A (e.g., a narrower end) that is coupled, together with the arm 25, to a rotator 26'", and includes another end 38B that is open to allow light output from the bulb 13'" to pass through. The rotator 26'" is similar to the rotator 26 shown in FIGS. 1 and 3. Any means known in the art can be used to effect coupling of the end 38A to the rotator 26'". The bulb 13'" and the cage 38 thus rotate together under the drive of the rotator 26'". In alternative embodiments, a separate coupling to the rotator 26'" than the coupling used to drive the arm 25 of the bulb 13'" could instead be used to couple the end 38A to the drive of the rotator 26'".

Figure 8:
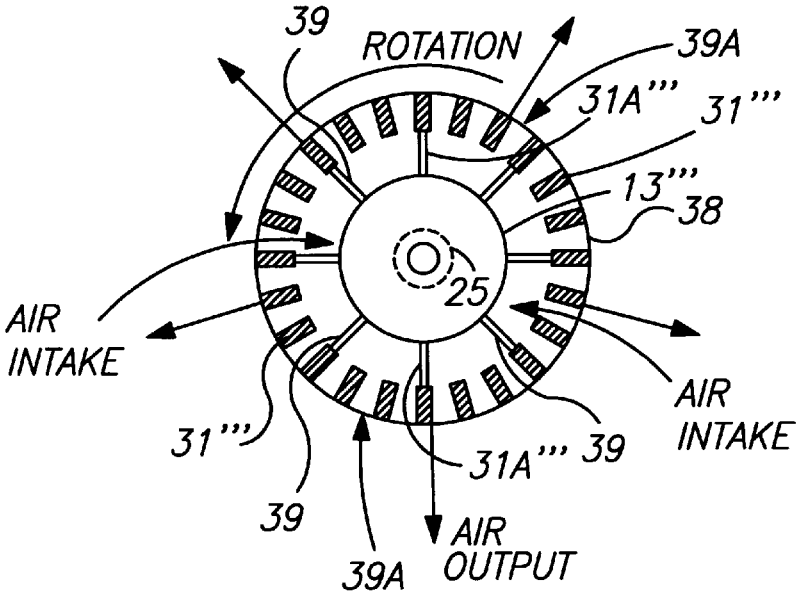
FIGS. 8 and 9 are an end view and a perspective view, respectively, of a light source in accordance with an embodiment of the invention.
Figure 9:
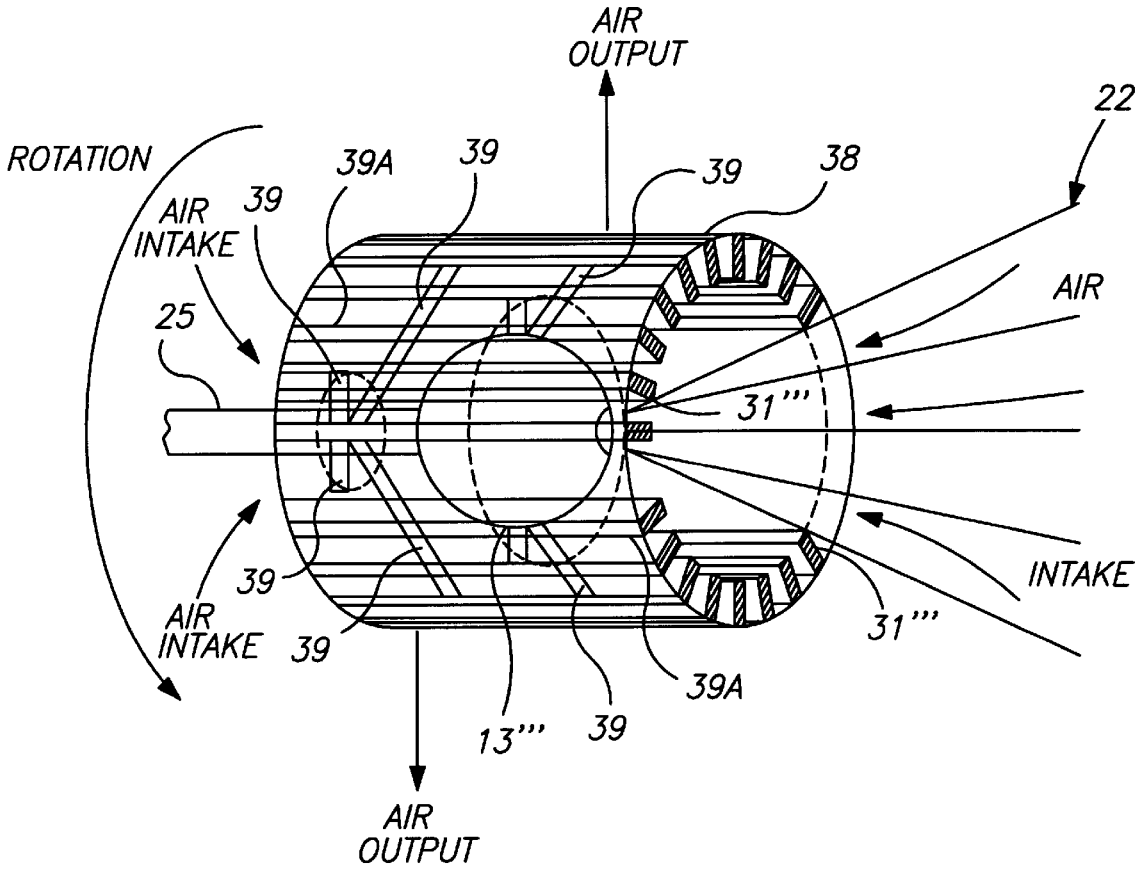

The cage 38 can have spokes or stabilizers 39 that extend between the cage 38 and the bulb 13'", as shown in an end view in FIG. 8 and in a perspective view in FIG. 9, in accordance with another alternative embodiment of the invention. In this embodiment, the spokes 39 are part of the cage 38 and can be constructed of the same material as the cage 38. The spokes 39 are couple to the bulb 13'" and the shaft 25, as shown in FIGS. 8 and 9. Other arrangements of the spokes 39 can be envisioned, as will be appreciated by those skilled in the art, and are included within the scope of the invention.

The material of the spokes 39 can be metal, quartz, sapphire, glass, high temperature plastic, and the like, as described above, depending on the type of light source and its excitation source, and as long as the material can withstand the heat generated by the bulb 13'". The coupling of the spokes 39 to the bulb 13'" and to the shaft 25 may be accomplished when the bulb 13'" is initially constructed. For example, if the spokes 39 are constructed of metal, the coupling can be accomplished when the material of the bulb 13'" (e.g., glass) is heated and is malleable and can be formed and hardened (i.e., fixed) around ends of the spokes 39, as will be appreciated by those skilled in the art. The spokes 39 could be pushed into the heated and malleable glass of the bulb 13'" and the shaft 25. As the glass then cools, the spokes 39 would become fixed in place in the glass of the bulb 13'" and the shaft 25. Of course, the metal spokes 39 would be physically separated from any rf excitation coil for fill excitation with rf energy. The spokes 39 would be constructed of electrically insulating material (e.g., quartz, sapphire, and the like, as described above) if used in a microwave cavity for fill excitation with microwave energy. Other possible construction techniques for the different materials used for the cage 38 and other designs for the cage 38, the spokes 39, and the light sources disclosed herein are contemplated that are included within the scope of the invention.

As the cage 38 is rotated, the motion of the fins 31'" will force air generally radially outward between the fins 31'" as shown in FIGS. 7–9. The cage has openings 39A (see FIGS. 7–9) between the fins 31'" to allow such air passage. As a result, air will be drawn through the open end 38B and a back end 38C, which includes openings (not shown in detail in FIG. 7), toward the bulb 13'". The drawn air can cool the bulb 13'" in similarity to the description set forth above, and then pass through the openings 39A.

Projection systems, including front and rear projection systems, can advantageously employ the system 100 in FIGS. 1 and 5 having the bulbs 13, 13', 13", 13'" in accordance with embodiments of the invention. FIG. 9 illustrates a rear projection display system 40 similar to systems described in prior, co-owned U.S. Pat. application Ser. Nos. 08/581,108, now abandoned, filed Dec. 29, 1995, entitled "Projecting Images," and 08/080,178, now U.S. Pat. No. 5,545,599, filed Jun. 20, 1997, entitled "Projecting Images," in aforementioned U.S. Pat. application Ser. No. 08/747,190, now U.S. Pat. No. 5,833,360, and in European Pat. application No. 96309443.8, EPO 783133A1, filed Dec. 23, 1996, also entitled "Projecting Images," published Jul. 9, 1997. U.S. Pat. application Ser. Nos. 08/581,108, now abandoned, and 08/080,178, now U.S. Pat. No. 5,459,599, and European Pat. application No. 96309443.8, EPO 78313A1 are incorporated by reference herein in their entirety. The system 40 may be used as part of or in a computer monitor or television display.

The display system 40 includes an image engine 42, which may be similar to image engines described in prior, co-owned U.S. Pat. application Ser. No. 08/730,818, filed Oct. 17, 1996, entitled "Image Projection System Engine Assembly," incorporated by reference herein in its entirety. The image engine 42 may also be similar to a conventional image projection engine, such as a reflective or transmissive LCD projector. The image engine 42 includes an image source 44 and a light source 45 (e.g., the light source 10) that provides light (e.g., the light 22 in FIGS. 1, 5, 6B, 6C, 7, and 9) to the image source 44.

The display system 40 may be a field sequential projection display, which provides a color display with various colors and variable color brightness. In such systems, the individual pixels of the image source 44 of the display system 40 are not dedicated to a single color. Instead, the pixels transmit or reflect, depending on the system design, each of the primary colors, red, green and blue, or other colors that are provided sequentially in time at appropriate intensities. The system 40 may exhibit very high resolution, because each pixel can assume any of the colors independently of its neighboring pixels. In a field sequential color system, color and color brightness are controlled in the time domain (e.g., by pulse width modulation). Such systems typically use an electronically controlled filter to provide the three primary colors sequentially. The filter can be an LCD, an FLCD, or a deformable or digital micro-mirror device (DMD) as the image source 44 that quickly cycles through each primary color. Alternatively, a rotating shutter or color wheel, (not shown) having a transmission or reflection filter (e.g., a dichroic filter) for each one of the three primary colors, or an electro-optic color shutter or another color sequencer, may be used to provide the sequential colors to the image source 44.

The display system 40 may alternatively have the image source 44 include a number of pixels arranged in groups of red, green, and blue. Each pixel transmits or reflects, depending on the particular design, colored light corresponding to the group arrangement. A particular color is achieved in an area of the display by turning "on" or "off" the appropriate pixels in that area. Brightness is also controlled by turning pixels on or off.

In another alternative embodiment of the system 40 having higher resolution, the image source 44 may include a number of pixels again arranged in groups of red, green, and blue. Each pixel transmits or reflects, again depending on the particular design, corresponding red, green, or blue light. A particular color is achieved in an area by turning appropriate pixels in the area on or off. Brightness in this alternative system is controlled by varying the amount of light transmitted by a pixel turned on, rather than by turning off some of the pixels.

Baur et al. disclose a similar system in "High Performance Liquid Crystal Device Suitable For Projection Display," SPIE Proceedings, Volume 2650, pages 226–228 (29–31 Jan. 1996), incorporated by reference herein in its entirety. U.S. Pat. No. 5,453,859, entitled "Polarization Beam Splitter And Projection Display Apparatus," issued to Sannohe et al., also incorporated by reference herein in its entirety, discloses another similar system.

Regardless of the type of display the system 40 is, the image source 44 receives light (e.g., the light 22 from the light source 10) and outputs image light 46 in response to input signals, for example, electronic, video, or other signals received from an antenna, cable, computer, or controller (not shown). The image light 46 reflects off a lower mirror or reflector 48 to a higher mirror or reflector 50. The light 46 is then reflected by the upper mirror or reflector 50 and is directed to a screen 52. The screen 52 may be a diffusive screen or diffuser. The screen 52 scatters the image light 46 as light 54, which a viewer 56 can see as forming an image at the screen 52 of the display system 40.

Figure 11:
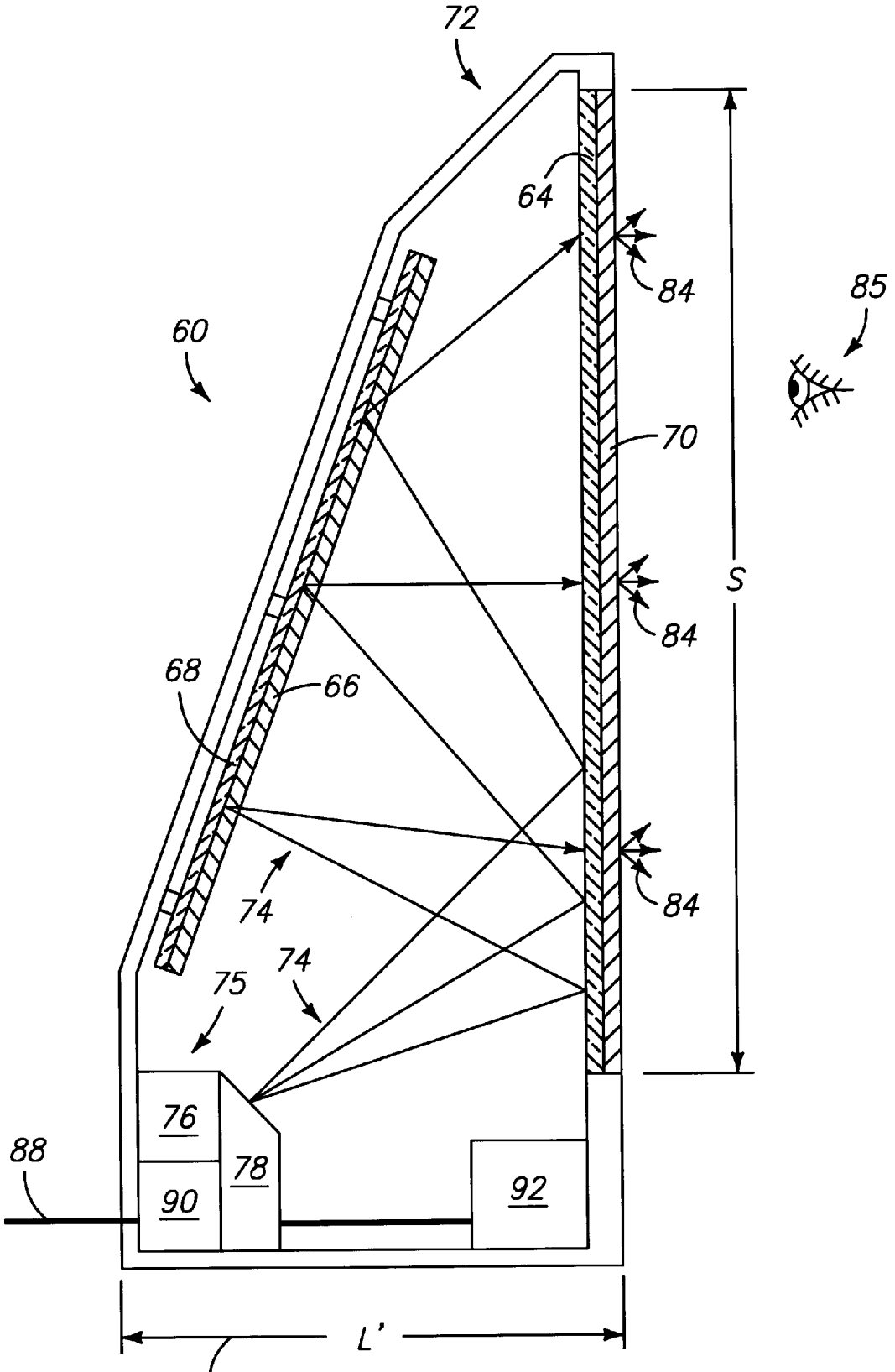

FIG. 11 illustrates another rear projection video system 60 in which the light source 10 in FIGS. 1 and 5 can be advantageously employed, in accordance with an embodiment of the invention. The rear projection video system 60 is also similar to those described in the aforementioned U.S. Pat. application Ser. Nos. 08/581,108, 08/080,178, and 08/730,818. The system 60 may also be used as part of or in a computer monitor or television display.

Figure 12:
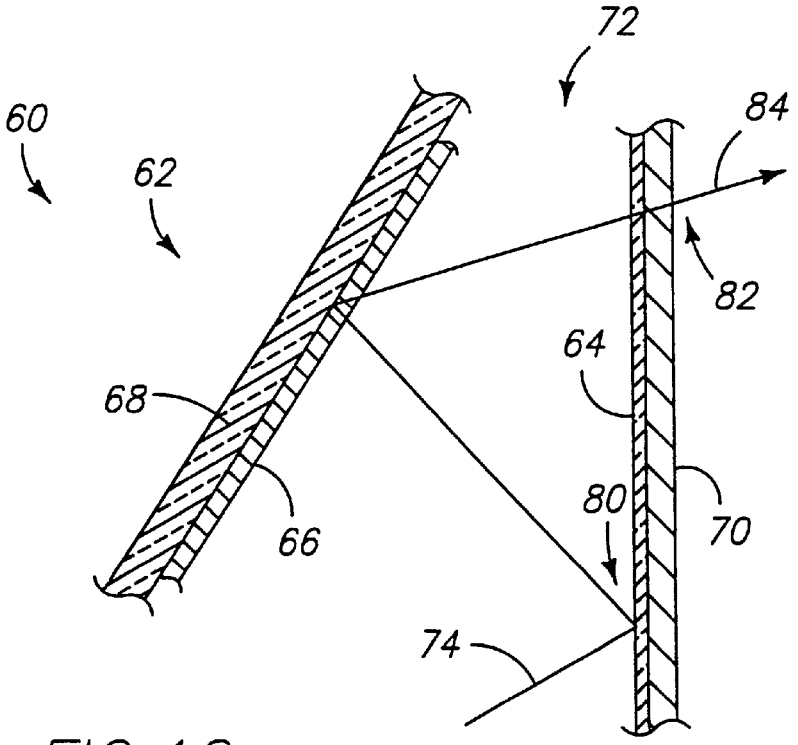
FIG. 12 is a view of a portion of the projection system in FIG. 11.

FIG. 12 is a blow-up of a portion 62 of the rear projection video system 60 in FIG. 11. The system 60 includes a linear reflecting polarizer 64, an achromatic retarder 66, a reflector 68, and a display screen 70 that form "folded" optics or optical train 72 for projecting an image on the display screen 70. The achromatic retarder 66 and the reflector 68 may be adjacent or held in spaced apart relation. The system 60 also includes an image engine 75 that includes a light source 76 (e.g., the light source 10 in FIGS. 1 and 5) and an image source 78 (similar to the image source 44 in FIG. 10). The light source 76 could also be similar to light sources disclosed in the aforementioned U.S. Pat. Nos. 5,404,076 and 5,606,220, or in the aforementioned U.S. Pat. application Ser. No. 08/747,190. A portion of light 74 (similar to the light 22 in FIGS. 1, 5, 6B, 6C, 7, and 9) reflects from the reflecting linear polarizer 64 of the folded optics 72 at one instance 80. It then passes through the achromatic retarder 66, where its polarization is rotated by substantially 45°, reflects from the reflector 68, and passes again through the achromatic retarder 66 with another substantially 45° polarization rotation. The polarization of the light 74 is thus rotated by approximately 90°. It then passes through the reflecting linear polarizer 64 and the display screen 70 at another instance 82 as light 84. The light 84 forms an image that can be seen by a viewer 85. Optical folding enables the system 60 (and the system 40 in FIG. 10) to be shallow, i.e., to have a smaller footprint 86, ("L'" in FIG. 11 and "L" in FIG. 10) for an apparently larger projection distance than would be possible in some unfolded systems. Another way of saying this is that the ratio of the screen size ("S" in FIG. 11) to footprint size (i.e., S/L') is large compared to some unfolded systems. Multiply-folded systems other than those shown in FIGS. 10–12(e.g., the folded optics 72) could be envisioned in accordance with other embodiments of the invention.

The image source 78 receives electrical signals through an input cable 88 and converts the signals into the primary image beam 74 with light incident (not shown) from the light source 76. The types of electrical signals used to create the primary image beam 74 may include television signals, such as those received by an antenna or over cable lines and processed by a video receiver (not shown), and computer video signals generated by a computer system (not shown). Audio signals may also be received from the input cable 88 and processed by a signal splitter 90 and a sound system 92. The image source 78 may include any conventional image projection engine, such as a FLCD projector or other liquid crystal display (LCD) projector. The image source 78, or, alternatively, the light source 76, must produce polarized light (e.g., using a reflecting or absorptive polarizer, which is not shown in FIG. 11). A wide variety of other types of video systems employ polarization in image formation.

Figure 10:
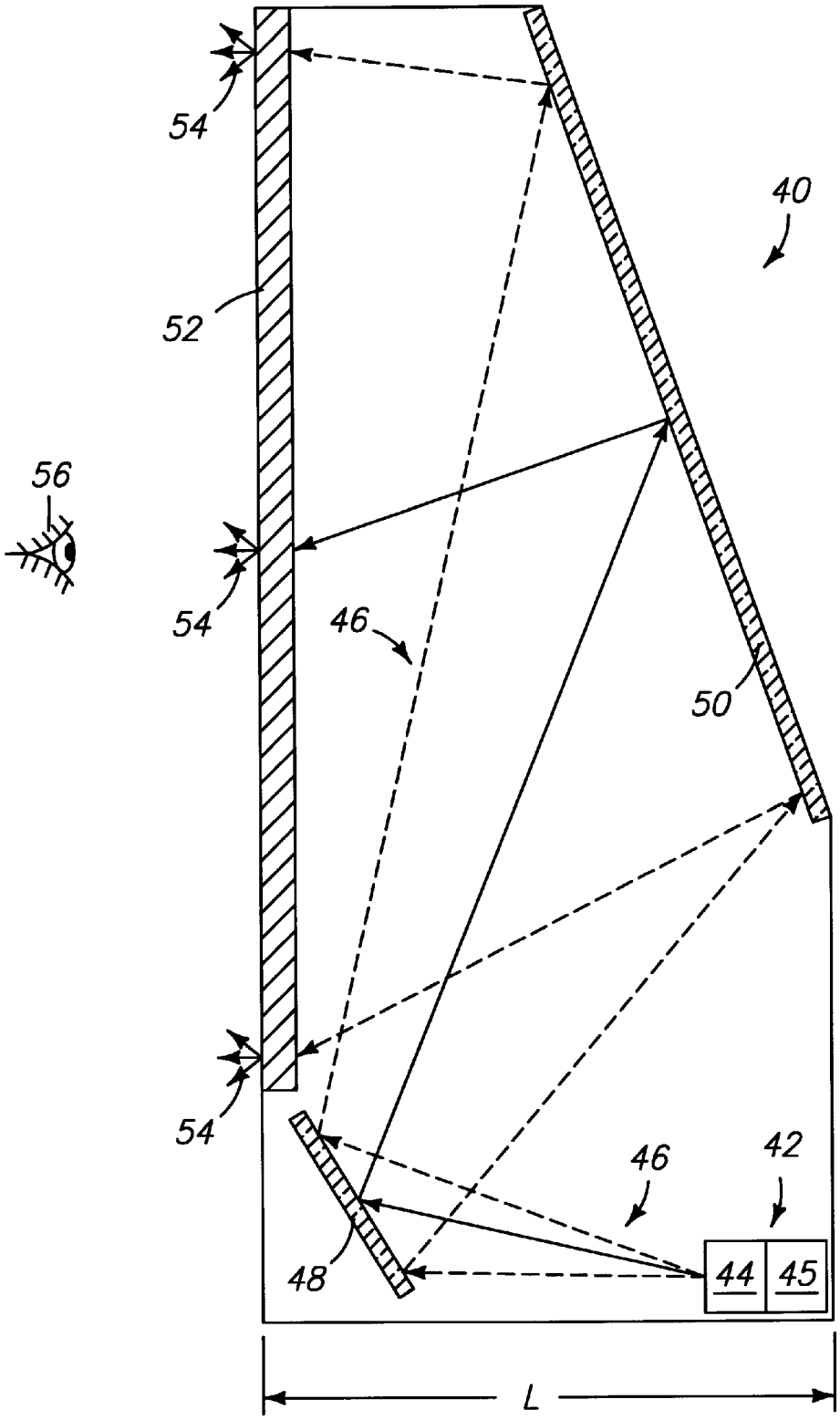
FIGS. 10 and 11 are side views of rear projection systems in accordance with embodiments of the invention.
Figure 13:
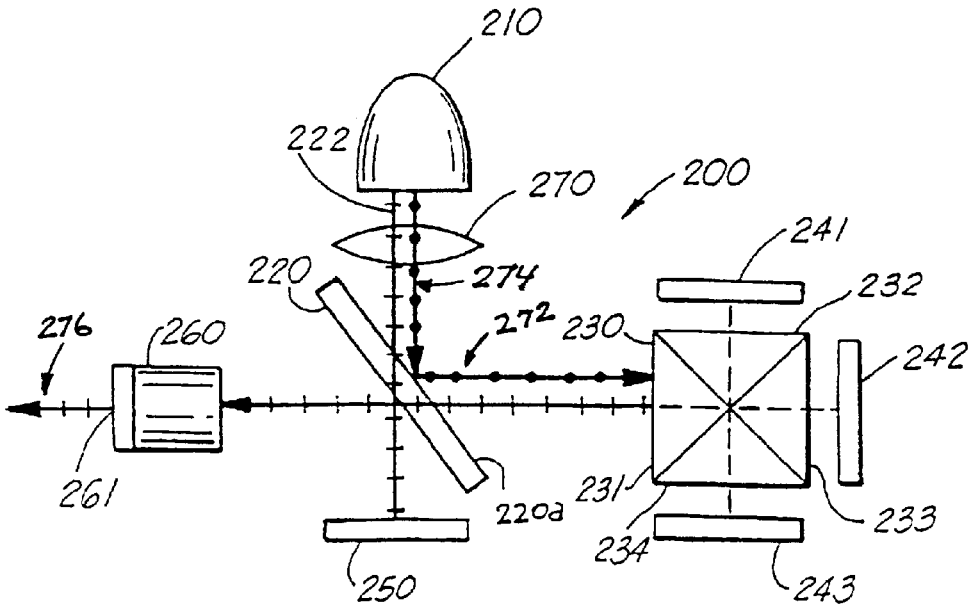
FIG. 13 is a top view of a projection display apparatus in accordance with an embodiment of the invention.

FIG. 13 shows an image engine 200 that may be used for the image engines 42 or 75 in FIGS. 10 and 11, respectively. The image engine 200 includes a light source 210, which outputs light 222 through an optional condenser lens 270 to a polarizer/analyzer 220, a beam splitter/combiner 230, reflecting polarizing LCDs 241, 242, 243, a optional mirror 250, a projection lens 260, and an optional clean-up polarizing filter 261. The light source 210 can be the light source 10 and the light 222 can be the light 22 in FIGS. 1, 5, 6B, 6C, 7, and 9. The polarizer/analyzer 220 can be a reflecting polarizer like the filter 24. The beam splitter/combiner 230 can be an X-cube prism or a Phillips prism, or another type of prism that can split or combine beams of light. The image engine 200, including the light source 10, may be used in the systems 40 or 60 shown in FIGS. 10 and 11. If the systems 40 or 60 are field sequential color systems, the beam splitter/combiner 230 is not needed and only one LCD (e.g., the LCD 242) need be used.

The light 222 from the light source 210, whether red, green, or blue light (e.g., in a field sequential color system) or white or "quasi" -white light (for other systems), passes through the condenser lens 270 (if present). Quasi-white light is light which is substantially white light, but is reduced in or lacks certain color components. The light 222 may already be polarized (e.g., S-polarized) if a polarizer, such as the filter 24 in FIGS. 1 and 5 is used at the output of the light source 210, or it may be unpolarized. The reflecting polarizer 220, which may be constructed of MOF or some other substantially nonabsorptive reflecting polarizer or other wide angle polarizer, has an intrinsic direction of orientation or optical axis. This axis may be aligned to the polarized or unpolarized rays of the light 222, for passing substantially all of the components of (unwanted) light polarized in a first direction (if there are any) and for reflecting substantially all of the components of (wanted) light polarized in a second direction. The light polarized in a direction parallel to the plane of incidence, P-polarized light, may be the light polarized in the first direction. The light polarized in a direction perpendicular to the plane of incidence, S-polarized light, may be the light polarized in the second direction. The reflecting polarizer 220 could be set to work at various angles, with corresponding changes to the remainder of the optics to account for the other angles. With the reflecting polarizer 220 being an appropriate wide angle reflecting polarizer, such as MOF, this is possible.

The unwanted (e.g., P-polarized) portion of the light 222 can be directed through the reflecting polarizer 220 to the mirror 250, if present. This light could be reflected back through the reflecting polarizer 220 to the light source 210. The light source 210 could of a variety that can reabsorb this reflected light and exhibit "optical pumping" for re-emission as the wanted light. Such light sources are disclosed in the aforementioned Pat. application Ser. Nos. 08/581,108 and 08/730,818. The light reflected by the mirror 250 and/or or the use of the reflecting polarizer 220 could also help reduce or eliminate possible detrimental thermal effects in components of the system 200 in addition to such use of the cooling fins 31, 31', 31" and 31'" in the bulbs 13, 13', 13", and 13'". It will be appreciated that the mirror 250 is not strictly necessary. This is especially true if the source 210 initially provides light already of only the desired polarization. In that case, very little light will pass through the reflecting polarizer 220, so the mirror 250 can be eliminated. Even if the light is not prefiltered in this way, the mirror 250 could be eliminated.

Referring again to FIG. 13, the wanted portion of the light 222 reflects off surface 220 of the reflecting polarizer 220 to the beam splitter/combiner 230. The beam splitter/combiner 230 has a first, primary incidence plane 231 through which the wanted portion of the light 222 passes. As will be appreciated by those skilled in the art, the beam splitter/combiner 230 has surfaces specially coated to split rays of polarized red, green, and blue light (e.g., Spolarized) obtained from the light source 210. The beam splitter/combiner 230 splits two of the three colored rays of the wanted portion of the wanted portion of the light 222 in different directions. Thus, substantially all of a first light color (e.g., the blue light) is directed through a second plane 232 of the beam splitter/combiner 230, substantially all of a second light color (e.g., the green light) is directed straight through a third plane 233 of the beam splitter/combiner 230, and substantially all of a third light color (e.g., the red light) is split and directed through a fourth plane 234 of the beam splitter/combiner 230. While red, green, and blue colored light is discussed for this embodiment, any three colors obtained from the light source 210 could be used for imaging, for example, by filtering of the light 222 or by use of other special coatings on the planes of the beam splitter/combiner 230.

The reflecting polarizing LCDs 241, 242, 243 may be liquid crystal spatial light modulators. These LCDs each operate as a type of variably birefringent switch with each pixel (not shown) having states. In a first state, the polarization of the light reflected by a pixel of the LCD is essentially unaffected, resulting in the reflected light being of the same polarization as the incident light (e.g., S-polarized). When the pixel is fully energized to a second state, however, the incident light is retarded by approximately one-quarter wave in a single pass through the pixel, reflected by a reflector in the LCD, and then again retarded by another one-quarter wave in a subsequent pass through the same pixel on its return path. The result is a rotation of the light polarization by approximately 90°. Thus, for example, the S-polarized light is reflected as P-polarized light. In between the first and second pixel states, depending on the particular type of LCD, components of each orthogonal polarization may be apparent, resulting in elliptically or circularly polarized light in the return path. The degree of polarization in a particular direction is determined by the amount of voltage applied to the particular pixel in the LCD. The LCDs 241, 242, 243 are electrically controlled, such as with television signals, signals from a person computer, or other means, as discussed in the aforementioned U.S. Pat. application Ser. No. 08/880,178. The reflected light can be S-polarized (i.e., substantially unchanged), substantially P-polarized, or elliptically (or circularly) polarized. The LCDs 241, 242, 243 can be analog LCDs in the sense that the amount of polarization change for light that reflects from an LCD pixel is related to the voltage level applied to that pixel. This allows the intensity of each color to be individually adjusted, providing for multiple color shades and hues. Alternatively, the LCDs 241, 242, 243 can be FLCDs, where each pixel is instead only on or off. With FLCDs, time (e.g., pulse width) modulation can be used to modulate the pixels. One electrical pulse width, corresponding to color information in the video signal input, may be used to modulate within each frame, for example, in a field sequential color system, and/or to perform frame-to-frame modulation to approximate a brightness for a color.

P-polarized and S-polarized components returned from the LCDs 241, 242, 243 are recombined in the beam splitter/combiner 230 as light 272. When the light 272 strikes the reflecting polarizer 220, the P-polarized (wanted) components pass through, while the S-polarized components are reflected back toward the light source 210 as light 274. The P-polarized components pass through the projection lens 260 and the clean-up polarizing filter 261 (if present) and out of the apparatus 200 as image light 276 (e.g., the light 46 or 74 in FIGS. 10 and 11, respectively) for projection to the screens 52 and 70, as described above. The remaining S-polarized components reflected by the reflecting polarizer 220 can be directed back into the light source 210, serving to optically pump the bulbs 13, 13', 13", 13'" and/or to reduce or eliminate thermal effects, as discussed above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A light source comprising:

a bulb having an interior;

a fill contained within the interior; and a fin extending from the bulb to draw air past the bulb when rotated.

2. The light source of claim 1, further comprising additional fins.

3. The light source of claim 2, wherein the fill, upon excitation, emits light.

4. The light source of claim 2, wherein the fins are integral with the bulb.

5. The light source of claim 2, wherein the bulb comprises quartz.

6. The light source of claim 2, wherein the bulb comprises a quartz envelope.

7. The light source of claim 2, wherein the bulb comprises a quartz sphere.

8. The light source of claim 2, further comprising a reflector adjacent the bulb to direct light from the bulb.

9. The light source of claim 2, wherein the fins extend radically outward from the bulb.

10. The light source of claim 2, wherein the fins cause the bulb to be cooled when rotated.

11. The light source of claim 2, wherein the fins are shaped to draw air when rotated.

12. The light source of claim 2, further comprising a rotator to rotate the bulb.

13. The light source of claim 2, wherein the fill achieves a plasma state upon excitation with electromagnetic energy.

14. The light source of claim 13, wherein the electromagnetic energy comprises microwave energy.

15. The light source of claim 13, wherein the electromagnetic energy comprises radio frequency energy.

16. The light source of claim 2, further comprising a cavity, wherein the bulb is disposed in a cavity.

17. The light source of claim 16, further comprising an electromagnetic source and a waveguide coupled between the electromagnetic source and the cavity to provide excitation energy to the fill.

18. The light source of claim 17, wherein the waveguide is arranged to transmit electromagnetic energy to excite the fill to a plasma state.

19. The light source of claim 18, wherein the electromagnetic energy comprises microwave energy.

20. The light source of claim 17, wherein the electromagnetic source comprises a microwave source.

21. The light source of claim 17, wherein the electromagnetic source comprises a radio frequency source.

22. A light source comprising:

a bulb having an interior;

a fill contained within the interior; and a cage disposed about the bulb comprising fins extending from the cage to draw air past the bulb when rotated.

23. The light source of claim 22, wherein the cage comprises a squirrel cage.

24. A light source of claim 22, wherein the cage comprises spokes that couple between the cage and the bulb.

25. The light source of claim 22, wherein the cage comprises an end and the bulb comprises a shaft, and wherein the end and the shaft are coupled to be driven together to rotate the cage.

26. The light source of claim 22, wherein the cage further comprises spokes coupling the cage to the light bulb, and wherein rotation of the bulb causes rotation of the cage by virtue of the spokes coupling the cage to the bulb.

27. The light source of claim 22, wherein the fins are curved.

28. The light source of claim 22, wherein rotation of the cage causes air to move generally readily from the cage.

29. The light source of claim 22, wherein rotation of the cage cools the bulb.

30. The light source of claim 22, wherein the cage comprises openings that allow air to pass through.

31. A method of cooling a light source, the method comprising:

rotating a bulb having fins extending from the bulb; and drawing air past the bulb by action of the fins.

32. The method of claim 31, further comprising angling the fins on the bulb so as to draw the air.

33. The method of claim 31, wherein rotating the bulb comprises rotating a shaft attached to the bulb.

34. The method of claim 31, further comprising generating heat in the bulb to dissipate by rotation of the fins.

35. The method of claim 31, further comprising determining a number of the filters to be attached to the bulb based on a color change frequency associated with the colored light being a multiple of a frequency of rotation of the bulb.

* * * * *